Fig. 1.

INVENTORS
WILLIAM M. GROSVENOR, JR.
BY WILLARD MARCY

ATTORNEY

Fig. 4.

INVENTORS
WILLIAM M. GROSVENOR, JR.
WILLARD MARCY
BY
Thomas F Moran
ATTORNEY

Fig. 5.

United States Patent Office 3,194,683
Patented July 13, 1965

3,194,683
PURIFICATION OF LIQUIDS, SUCH AS SUGAR SOLUTIONS, BY TREATMENT WITH AN ADSORBENT
William M. Grosvenor, Jr., Pelham, and Willard Marcy, Pelham Manor, N.Y., assignors to American Sugar Company, New York, N.Y., a corporation of New Jersey
Filed July 10, 1963, Ser. No. 293,966
11 Claims. (Cl. 127—46)

This invention relates to the treatment of liquids by contact with an adsorbent. More particularly, this invention relates to an improved method of carrying out the purification or treatment of liquids by contact with a selective adsorbent. In accordance with one special embodiment this invention is directed to the purification of sugar solutions by contact with a selective adsorbent, such as bone char, for the removal of color bodies and/or ash-forming materials therefrom.

In the treatment of solutions of sugar, such as aqueous solutions of the simple hexoses, the disaccharides, e.g. sucrose from cane or beet, and mixtures of mono-, di- and other polysaccharides such as are obtainable by the hydrolysis of starches, it has been the practice heretofore to pass such solutions through a bed of solid, particle-form adsorbent material to effect the removal of color bodies and other organic and inorganic impurities from such solutions. In the usual practice these solutions are passed downwardly through one or more fixed beds of adsorbent material, such as granular activated carbon, bone char and the like. This purification operation is carried out until the adsorbent material has become spent or is substantially depleted of its capacity or ability to effect color removal or improvement in the sugar solution in contact therewith.

When a fixed bed of adsorbent material becomes spent or depleted, it has been the practice heretofore to remove any remaining sugar solution from contact with the adsorbent by washing the adsorbent with water. This washing operation, usually referred to as a sweetening-off or desweetening operation, is carried out and the wash water effluent recovered until the sugar content or other values in the wash water effluent becomes too low for economical recovery. At this stage the washing operation is continued but the wash water effluent is then passed into the sewer. During this final stage of the washing operation the inorganic ash-forming constituents tend to be removed from the adsorbent. Following the washing operation the adsorbent material is discharged, dewatered and re-activated, such as by burning in the case of bone char and the like, in a controlled atmosphere. Following reactivation the adsorbent is returned to the sugar purifying operation.

The aforesaid operations are time-consuming and necessitate a rather large investment in adsorbent and plant equipment, such as tankage, piping, instruments and the like, in order to make possible a large capacity plant. Further, the quantity of wash water effluent containing sugar values recovered from the fixed bed desweetening operation is rather large and requires correspondingly large concentration or distillation facilities for the handling and concentration of the wash water effluent. Also, the quality of the wash water effluent is less than desirable. Specifically, it is found that the sugar content of the wash water effluent varies over a wide range and it is further observed that a very substantial amount of ash-forming materials is carried along with the sugar-containing wash water and tends to build up in the system, particularly when bone char is employed as the adsorbent.

Accordingly, it is an object of this invention to provide an improved process for the treatment and purification of liquids, particularly sugar solutions, such as cane sugar solutions and beet sugar solutions.

Another object of this invention is to provide a process for the purification of sugar solutions and the like wherein the amount of wash water handled is reduced and the quality of the wash water handled is improved.

Still another object of this invention is to provide a process for the purification of sugar solutions and the like capable of being applied to present installations with improvement in productivity of such installations.

Still another object of this invention is to provide a technique for increasing the capacity of conventional sugar refineries employing a plurality of fixed beds of adsorbent material such as bone char.

How these and other objects of this invention are achieved will become apparent in the light of the accompanying disclosure and drawings wherein.

In accordance with this invention it has been discovered that in a liquid treating operation wherein liquid is treated, such as for the removal of impurities therefrom, by contact with or percolation through one or more of a plurality of fixed beds of solid treating agent, such as selective adsorbent, and wherein the treating agent in a fixed bed becomes spent or depleted of its capacity to effect treatment or a desired improvement in the liquid undergoing processing, improved results are obtainable by directly removing the spent or depleted treating agent from the fixed bed upon depletion and subjecting the spent treating agent to a continuous treatment for the removal of occluded liquid, adsorbed impurities and at least partial reactivation.

The special treating agents or adsorbents to which the practice of this invention is applicable may be identified as Type I, II and III adsorbents. Type I are selective adsorbents, such as granular activated carbons, which are capable of removing color bodies or other organic impurities from aqueous solutions. Examples of such activated carbons are granular Darco manufactured by Atlas Chemical Industries, activated carbons sold under the trademarks SL, SGL, CAL and OL, manufactured by Pittsburgh Chemical Company, as well as other activated carbons such as the activated carbons made from coal as described by J. G. King et al. in Technical Paper No. 47, Fuel Research, the Department of Scientific and Industrial Research, entitled "The Production of Active Carbon from Bituminous Coal," published by H. M. Stationery Office, 1958. Type II adsorbents are those adsorbents capable of removing mineral inorganic matter as well as color or color bodies and other organic impurities from aqueous solutions, such as sugar solutions. Type II adsorbents include bone char and the various synthetic bone chars, such as the Synthads manufactured by The Baugh Chemical Company, Baltimore, Maryland. Type III selective adsorbents which are useful in the practice of this invention include those materials or compositions capable of removing ionized mineral matter and ionized coloring matter from solutions, such as sugar solutions. Suitable such agents include the ion exchange resins, both anionic and cationic.

More particularly, and in accordance with a special embodiment of the practice of this invention applied to the purification of sugar solutions, such as cane sugar or beet sugar solutions, employing bone char as the adsorbent or purifying agent, and wherein the sugar solution is purified by contact with one or more fixed beds of bone char, improved results are obtainable by carrying out the sugar solution purification operation such that when any fixed bed of bone char has become spent of its ability or capacity to effect the desired purification of the sugar solution, removing the thus-spent bone char and subjecting the spent bone char to a series of continuous operations involving continuous desweetening to effect removal of occluded sugar values from the bone char by causing the bone char to move in continuous direct contact, such as in the form of a downwardly moving of settling bed, with a flow of an aqueous solution, such as water, followed by a continuous direct washing operation for the removal of inorganic materials, such as ash-forming constituents, from the bone char by subjecting the desweetened bone char, such as in the form of a downwardly moving or settling bed, to direct countercurrent contact with an upwardly flowing body of water. Following the aforesaid desweetening and deashing operations the thus-treated bone char is de-watered, reactivated, cooled and returned to the purification system for reinstallation as a fixed bed of bone char to purify additional sugar solution.

Although emphasis is placed in this disclosure on the applicability of the practice of this invention to the purification of sugar solutions, employing bone char as the selective adsorbent, the practice of this invention is generally applicable to the treatment and purification of liquids broadly, such as solutions, aqueous or non-aqueous, of organic and/or inorganic compounds for the purification and/or for the separation of one or more constituents therefrom. Liquid solutions or liquids containing such materials as organic acids, e.g. fatty acids, alcohols, esters, petroleum hydrocarbons, wines, fermentation broths and also solutions of inorganic compounds, such as spent electroplating solutions or spent electroless plating solutions, are suitable for improvement and purification in accordance with the practice of this invention.

Figure 1:
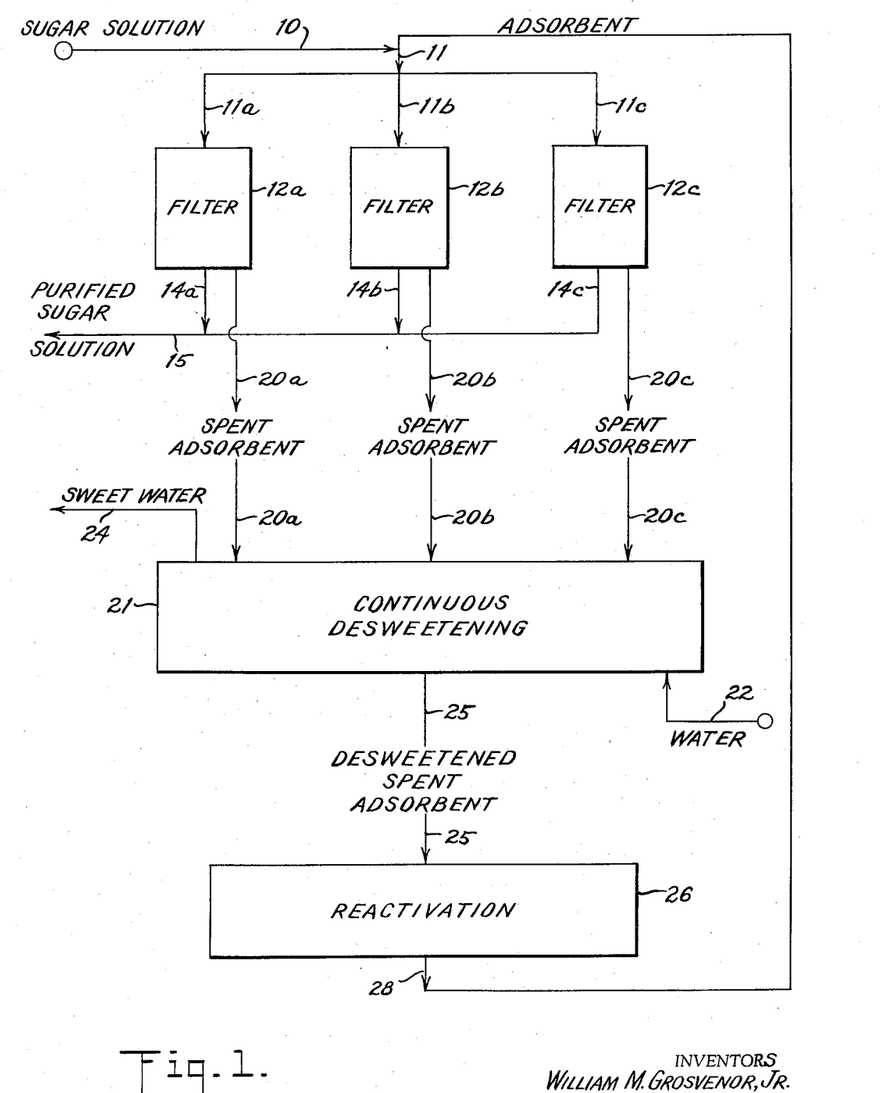
FIG. 1 is a flow chart outlining the practice of this invention.

Referring now to the drawings and particularly to FIG. 1 thereof, which is a flow chart schematically illustrating the practices of this invention as applied to the treatment of sugar solutions, such as cane sugar solutions, with a special adsorbent, such as bone char or an activated carbon, sugar solution to be purified is supplied via lines 10, 11, 11a, 11b and 11c to an array of fixed filter beds 12a, 12b and 12c of adsorbent. Usually these filters are rather large vessels or cisterns having a diameter in the range 6–12 feet and a height in the range 12–24 feet and are substantially completely filled with the adsorbent. The sugar liquor percolates down through these filters and is purified therein. The purified liquor is recovered from the bottom of these filters as an effluent product stream via lines 14a, 14b, 14c and 15.

After a period of time the adsorbent within each of filters 12a, 12b and 12c becomes spent or depleted of its ability to effect the desired purification of the sugar solution. As the adsorbent in each filter becomes depleted the filter is deliquored by draining off any sugar solution. The deliquoring operation may be carried out in situ within the filter containing the spent adsorbent or in a separate facility provided with suitable means for separating liquids and solids wherein the spent adsorbent and sugar solution are dumped.

Following the deliquoring operation the spent adsorbent wet with occluded sugar solution is passed via lines 20a, 20b and 20c to continuous desweetening facility 21. The desweetening operation is carried out by effecting continuous direct countercurrent contact of the spent adsorbent with a stream of water introduced via line 22. Desirably the desweetening operation is carried out within apparatus such that the spent adsorbent moves downwardly in direct continuous countercurrent contact with an upwardly flowing stream of water. The effluent sweetwater containing the occluded sugar solution removed from the spent adsorbent by the water washing or desweetening operation is removed from desweetening facility 21 via line 24. The recovered sweetwater is subsequently treated by means involving distillation and crystallization for the recovery of sugar values therefrom.

Following the continuous desweetening operation the desweetened adsorbent is supplied via line 25 to reactivating facility 26.

Reactivating facility 26 usually comprises a kiln, such as a rotary kiln or a multiple hearth furnace, when the spent adsorbent is bone char or an activated carbon such as CAL for effecting high temperature heat treatment of the spent adsorbent with hot combustion gases under controlled conditions as to temperature and oxygen content to effect reactivation of the adsorbent. Following the reactivation operation the reactivated adsorbent is removed via line 28 and after suitable cooling is supplied via lines 28, 11 and 11a, 11b and 11c to filters 12a, 12b and 12c, respectively, for purification of additional sugar solution.

In the practice of this invention in the treatment of sugar solutions, particularly cane sugar solutions, employing bone char as the selective adsorbent, it is desirable to include, as a separate operation, a continuous deashing operation directly subsequent to the continuous desweetening operation. The continuous deashing operation is carried out in substantially the same manner as the continuous desweetening operation, i.e. contacting the spent, now desweetened, bone char with a countercurrently flowing stream of water. In the deashing operation, like in the desweetening operation, desirably the bone char undergoing treatment moves downwardly as a settling or moving bed in direct contact with an upwardly flowing stream of water. In the deashing operation the adsorbed ash-forming constituents and other water-soluble mineral materials are removed or desorbed from the bone char. A separate deashing operation, however, is usually not required when the adsorbent employed is an activated carbon such as CAL since such adsorbents exhibit little tendency to adsorb ash-forming constituents from sugar solutions.

Also, when adsorbents, such as bone char, synthetic bone char and activated carbon, are employed for the purification of sugar solutions, such as cane or beet sugar solutions, the desweetened adsorbent still containing the adsorbed impurities such as color bodies, floc-forming constituents and the like is reactivated by heat treatment such as by controlled burning in a kiln or multiple hearth furnace. Such drastic reactivation treatment however is not always necessary in the practice of this invention depending upon the solution being purified, the selective adsorbent or treating agent employed. For example, if ion exchange resins are employed as the treating agent such materials after desweetening can be satisfactorily reactivated by contact or washing with a suitable reactivating solution followed by a subsequent water washing operation for removal of the reactivating solution from the reactivated ion exchange resin.

As is apparent from the foregoing disclosure an important departure in accordance with this invention from prior practice of the treatment of sugar solutions such as cane sugar and beet sugar solutions, resides in carrying out the desweetening operation in a continuous manner and in a separate facility rather than, as has been the practice heretofore in sugar refining operations, carrying out the desweetening operation in situ in the filters containing the fixed beds of spent adsorbent. The advantages of carrying out a sugar refining operation in accordance with the practices of this invention are evident from the following.

In a conventionally operated sugar refinery employing a number, such as 20, of filters or stationary beds of bone char containing about 1200 cubic feet of bone char each, each of the beds of bone char would be operated on about an 85 hour cycle. In such an operation a bed of bone char would come off-stream every 4.25 hours. Assuming that the bone char employed has a bulk density of about 55 pounds per cubic foot, such a sugar refinery would require the reactivation of about 15,500 pounds of bone char per hour. This is about the bone char reactivation or burn-rate of a sugar refinery producing 1,240,000 pounds of sugar per day.

By applying the practices of this invention to such a sugar refinery, i.e. after each filter bed of bone char has become spent, dumping its contents and continuously desweetening and deashing the spent bone char in separate facilities, the cycle of each bed of bone char is reduced to about 57 hours. A filter bed would therefore come off-stream every two hours and fifty-one minutes. Such a relatively short cycle and high frequency of filter bed operation would permit an increased bone char reactivation or burn-rate of about 23,160 pounds per hour. This increased bone char burn-rate and availability of reactivated bone char is equivalent to an increase in sugar refining capacity of about 1,850,000 pounds of sugar per day, a productivity increase of about 50%.

Further, in the operation of a conventional sugar refinery, i.e. wherein the filter beds of bone char are desweetened and deashed in situ, it is necessary to follow the change in sugar concentration of the sugar solution flowing from the filter beds during the desweetening operation in order to determine the economical end of the desweetening operation. Accordingly, in a sugar refinery employing fixed bed desweetening and deashing, i.e. carrying out these operations in situ in the filter containing the spent bone char, and assuming a sugar solution feed for purification having a sugar concentration of 63° Brix, it is usual practice to pass the sweetwater to product recovery down to a concentration of about 35° Brix. Sweetwater recovered from the fixed bed desweetening operation having a concentration below 35° Brix to about 2° Brix is concentrated and treated for eventual recovery of sugar values therefrom. In such a sequence of operations, however, the volume of sweetwater produced sent to concentration is in the order of 4.0 gallons per 100 pounds of sugar product. Further, the sugar concentration of the effluent streams from the subsequent bone char washing operation ranges from a high of about 63° Brix down to a low of 2° Brix and lower. By applying the practices of this invention, however, the sugar concentration in the sweetwater recovered from the continuous countercurrent desweetening operation can be maintained constant at about 39° Brix. This amounts to a sweetwater production of only 2.52 gallons per 100 pounds of sugar product, a reduction in sweetwater production of about 60%.

In the conventional operation of a sugar refinery as described hereinabove, it has been observed that about 60% of the mineral matter or ash-forming constituents taken up by the bone char during the refining operation is released to the sweetwater and eventually returned to the main refinery stream. In the modified sugar refining operation in accordance with this invention, however, it has been found that the sweetwater recovered from the continuous desweetening operation contains practically no ash-forming constituents or mineral matter. This means that the efficiency of removal of the ash-forming constituents by the bone char is greatly increased.

Accordingly, by operating a sugar refinery in accordance with the practices of this invention, the following advantages are obtainable:

(1) A high sugar concentration sweetwater is produced, (2) The sugar concentration in the sweetwater recovered from the continuous desweetening operation can be maintained substantially constant, (3) A purer sweetwater is obtained by employing a continuous desweetening operation since less ash-forming material or mineral matter is released to the sweetwater due to the high sugar concentration in the sweetwater, (4) A reduced volume of sweetwater is produced, (5) A reduced amount of mineral matter or ash-forming constituents is recycled in the sweetwater, and (6) A marked increase in the productivity of the filters employed in a stationary char bed system is obtainable.

Figures 2, 3:
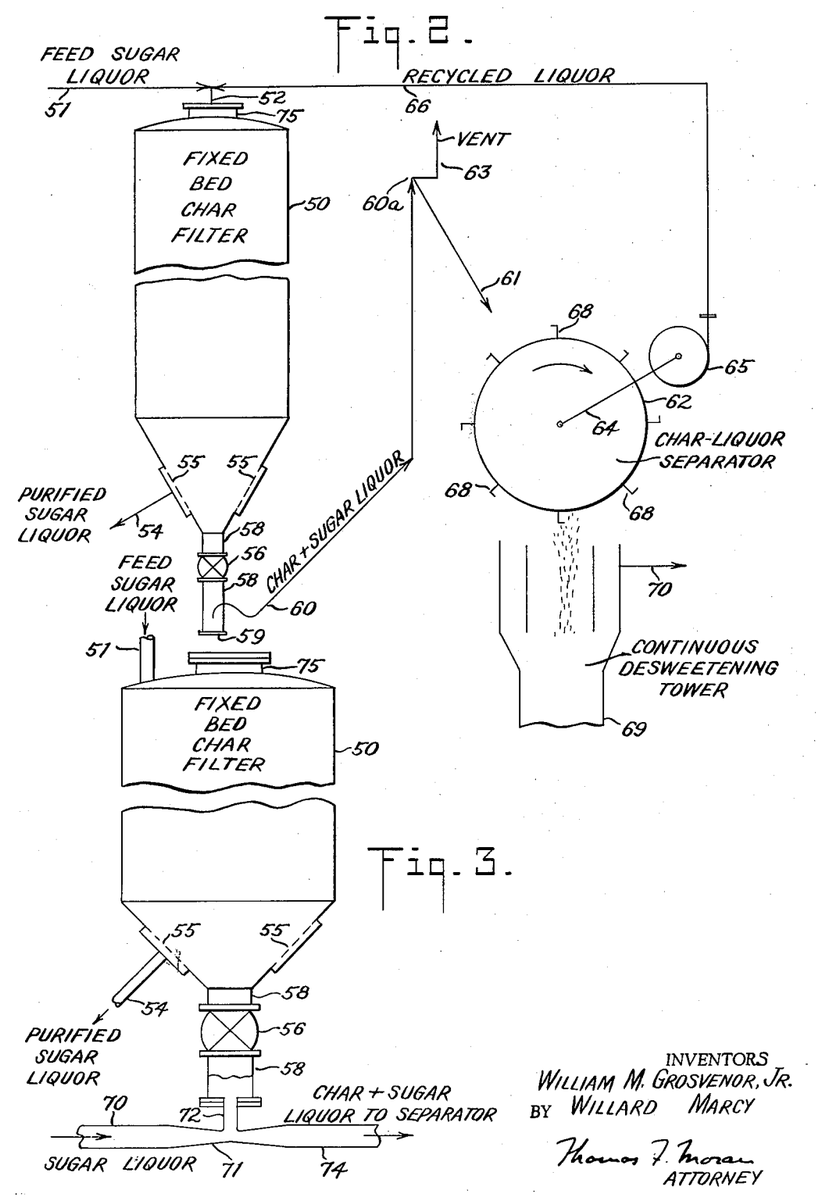
FIGS. 2 and 3 illustrate apparatus useful in the practice of this invention.

Referring now to FIG. 2 of the drawings, there is illustrated therein apparatus and methods in accordance with this invention useful for effecting sugar liquor purification and the transfer of spent char from a fixed bed of spent char to a suitable facility for effecting continuous desweetening of the spent char. In operation, a fixed bed of bone char is provided within filter 50 and feed sugar liquor for purification is introduced thereinto via lines 51 and 52 and the resulting purified sugar liquor is recovered from the bottom of filter 50 via line 54 after having passed through screen or false bottom 55 maintained with the lower portion of filter 50.

When the char within filter 50 has become spent, as evidenced by an undesirable color in the purified sugar solution withdrawn via line 54, the flow of purified sugar solution in line 54 is terminated and normally closed, full opening cock or valve 56 in line 58 connected to the bottom of filter 50 is opened. With the supply of feed sugar liquor still continuing via line 51 the sugar liquor flows downwardly within filter 50 through line 58 and cock 56, line 58 being blanked off at end 59. The flow of sugar liquor leaves line 58 via goose neck line 60 carrying with it the spent bone char. By regulating the elevation of the discharge end 60a of goose neck line 60 which is vented by means of line 63, the rate of discharge of sugar liquor and entrained char removed from filter 50 can be controlled. The internal diameter of goose neck line 60 is such that the fluid velocity of the sugar liquor flowing therein is sufficient to entrain and to transport the char.

The sugar liquor and char are discharged from line 60 via discharge line 61 onto the surface of a top feed rotary deliquoring screen 62. Sugar liquor falls through the screen and is recovered and discharged via line 64, pump 65, returned via lines 66 and 52 to filter 50 to pick up and transport additional char. The spent char deposited on the top surface of rotary screen 62 is carried on screen 62, being retained thereon by flights 68, for discharge into the top of desweetening tower 69 upon continued rotation of screen 62.

After a period of time when sufficient sugar liquor has been passed through screen 62 and has recycled through filter 50 the supply of feed sugar liquor via line 51 can be shut off and the sugar liquor then in the system employed to discharge and to transport the spent char from filter 50 via line 58 and goose neck line 60 to deliquoring screen 62. The above-described operations and apparatus provide means for transporting spent char from fixed bed filter 50 to a continuous desweetening tower without requiring dilution of the sugar liquor.

In certain sugar refineries where sweetwater handling capacity is a problem and a production bottleneck this is a very important feature. In those sugar refineries where sweetwater handling facilities do not present a problem the liquor-char slurry in discharge line 61 can be discharged directly to the continuous desweetening facility or tower 69. In such an operation, however, although the volume of sweetwater may be increased the sugar concentration of the sweetwater is also increased. Another method of effecting discharge and transport of char from filter 50 to deliquoring screen 62 involves employing the recycled liquor from pump 65 as a backwash through line 54 into the bottom of filter 50. Another alternative in accordance with the practice of this invention is to employ the sweetwater being discharged from desweetening tower 69 via line 70 to effect the transport of the spent char from filter 50. This can be done by connecting sweetwater discharge line 70 with the intake of pump 65. Various other techniques and arrangements, such as gravity flow, may be employed for the discharge of the spent char from the filter beds to the desweetening facility.

Another suitable arrangement is illustrated in FIG. 3 of the drawings, the same reference numerals being employed for the same functionally equivalent pieces of equipment. As illustrated in FIG. 3, char filter 50 is supplied with feed sugar liquor via line 51. Purified sugar liquor leaves the lower portion of filter 50 via line 54 after having passed through screen or false bottom 55. When the char within filter 50 has become spent, flow of purified sugar liquor through line 54 is terminated, normally closed valve 56 in line 58 is then fully opened. A stream of carrier sugar liquor is supplied via line 70 and by means of eductor tube 71 and line 72 in connection with the lower portion of line 58 spent char is carried from filter 50 through line 58, valve 56, line 72 and tube 71 and line 74 to a char-liquor separator, such as separator 62, of FIG. 2, for eventual discharge and supply of the spent char to a continuous desweetening facility. In this operation supplemental carrier liquor can be introduced to filter 50 via lines 51 and/or 54. As indicated in both FIGS. 2 and 3 a large flanged outlet 75 is provided at the top of filter 50 for the supply of char thereto.

Figure 4:
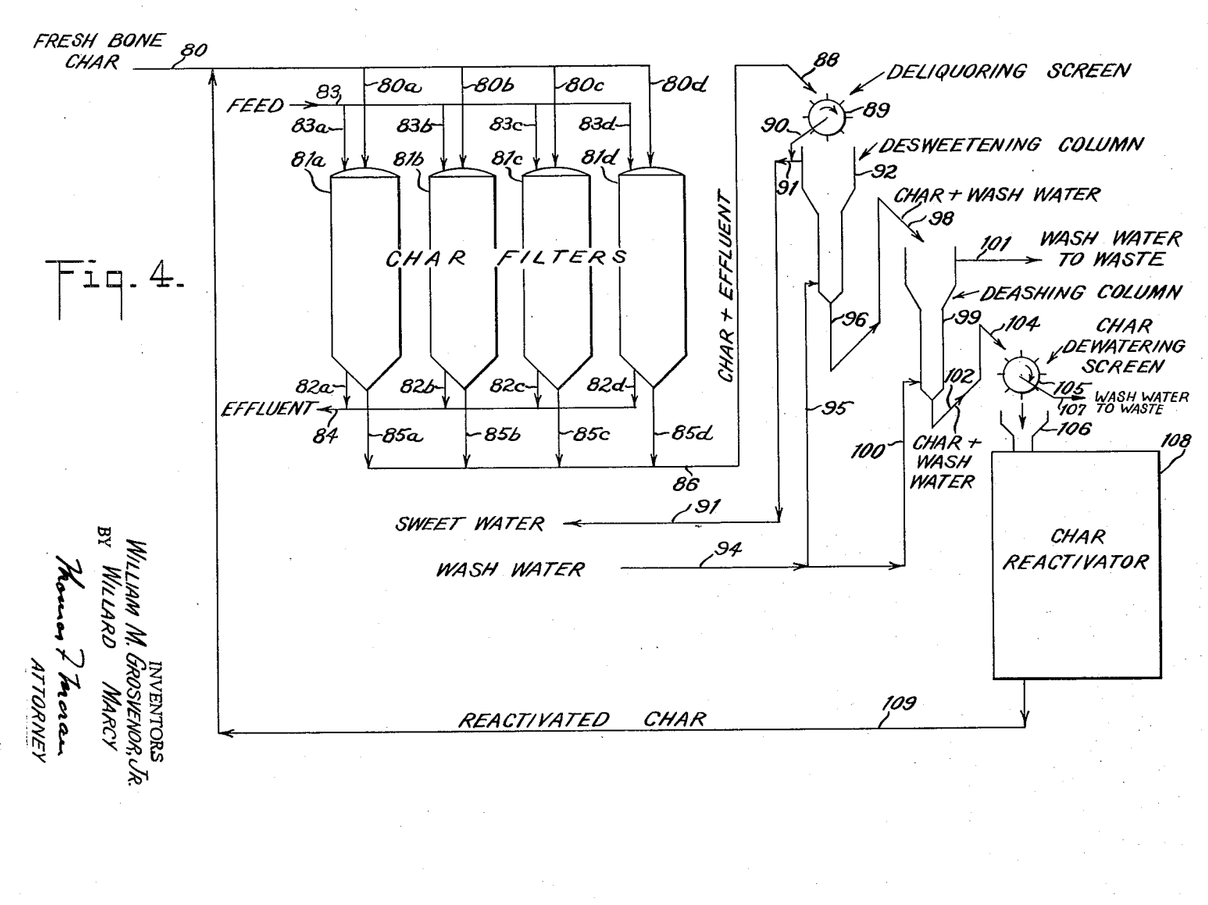
FIG. 4 is a flow sheet more completely illustrating the practice of this invention in an embodiment thereof employing parallel-connected plural char filters.

Referring now to FIG. 4 of the drawings which illustrates a process flow of the application of this invention to the refining of cane sugar solutions employing bone char as the selective adsorbent or purifying agent, freshly regenerated bone char is supplied via line 80 and lines 80a, 80b, 80c and 80d to fixed bed char filters 81a, 81b, 81c and 81d, respectively. Cane sugar solution to be purified is supplied from feed line 83 to filters 81a, 81b, 81c and 81d via lines 83a, 84b, 83c and 83d, respectively. Purified sugar solution is recovered from each of these filters via lines 82a, 82b, 82c and 82d, respectively, for transfer via line 84 for recovery of purified sugar product therefrom. As the bone char in any of filters 81a, 81b, 81c and 81d becomes spent, as evidenced by its inability to effect an improvement, such as decolorization, in the feed cane sugar solution supplied thereto, the flow of purified sugar solution from the filter containing the spent char is terminated and the spent char is transported from filters 81a, 81b, 81c or 81d, where required, via lines 85a, 85b, 85c or 85d, respectively, together with feed sugar solution as the char transporting medium, via line 86 for discharge via discharge line 88 onto the top surface of rotating deliquoring screen 89. Sugar liquor falls through the screen and is recovered and discharged via line 90.

The spent char from deliquoring screen 89 is discharged into the top of desweetening column 92 wherein it settles downwardly as a downwardly moving bed in direct countercurrent contact with an upwardly flowing stream or body of wash water supplied to the bottom of desweetening column 92 via lines 94 and 95. Sweet water effluent is discharged from desweetening column 92 via line 91. Line 90 is shown connected to line 91, whereby the sugar liquor and sweet water effluent are mixed in line 91. However, any of the embodiments discussed in relation to the system of FIG. 2 may be employed in FIG. 4 for handling the sweet water effluent and sugar liquor. Illustratively, in FIG. 2 the sugar liquor recovered from char deliquoring screen 62 is recycled by pump 65 and lines 66 and 52 to char filter 50 to assist in removing the char; in FIG. 4, therefore, the sugar liquor recovered from deliquoring screen 89 similarly may be recovered and recycled to assist in the char removal. To provide this function, line 90 is connected to feed line 83 rather than to the sweet water line 91, whereby the sugar liquor is recycled through lines 83a to 83d to the char filters 81a to 81d, respectively. The resulting desweetened spent char is continuously recovered from the bottom of desweetening column 92 and transported by water via line 96 and discharge line 98 into the top of deashing column 99. No dewatering of the desweetened char is necessary as it leaves the bottom of desweetening column 92 and is discharged into the top of deashing column 99.

The desweetened spent char settles within deashing column 99 as a downwardly moving bed in direct countercurrent contact with an upwardly flowing stream or body of wash water introduced into the bottom of deashing column 99 via line 100. Within deashing column 99 the water-soluble mineral matter and similar ash-forming constituents are removed from the spent char and are carried out in the wash water effluent withdrawn from the top of deashing column 99 via line 101 to waste. The resulting desweetened, deashed spent char is withdrawn from the bottom of deashing column 99 and transported via line 102 and discharge line 104 to the top surface of rotary dewatering screen 105.

As dewatering screen 105 rotates, the wash water passes through the screen and is recovered and discharged through line 107 to waste, and the desweetened deashed dewatered spent char is discharged via transfer means 106 to char reactivator 108, such as a rotary kiln or multiple hearth furnace, wherein the spent char is reactivated by heat treatment in the presence of a controlled oxygen content atmosphere. The resulting reactivated char is discharged from reactivator 108 via line 109 and supplied via line 80 as reactivated char to the char filters as required.

As indicated in FIG. 4 of the drawings, the char filters 81a, 81b, 81c and 81d are intermittently operated fixed bed char filters whereas desweetening column 92 and deashing column 99 are continuously operated. In actual plant operation the size and capacity of desweetening column 92 and deashing column 99 would be adjusted and correlated to the size and capacity and number of the char filters so that even with intermittent operation of the fixed bed filters there is a sufficient supply of spent char available to maintain the operation of desweetening column 92 and deashing column 99 on a substantially continuous basis. Similarly, the size and capacity of char reactivator 108 is correlated with respect to the major operating equipment so that char reactivator 108 can be operated on a substantially continuous basis.

Figure 5:
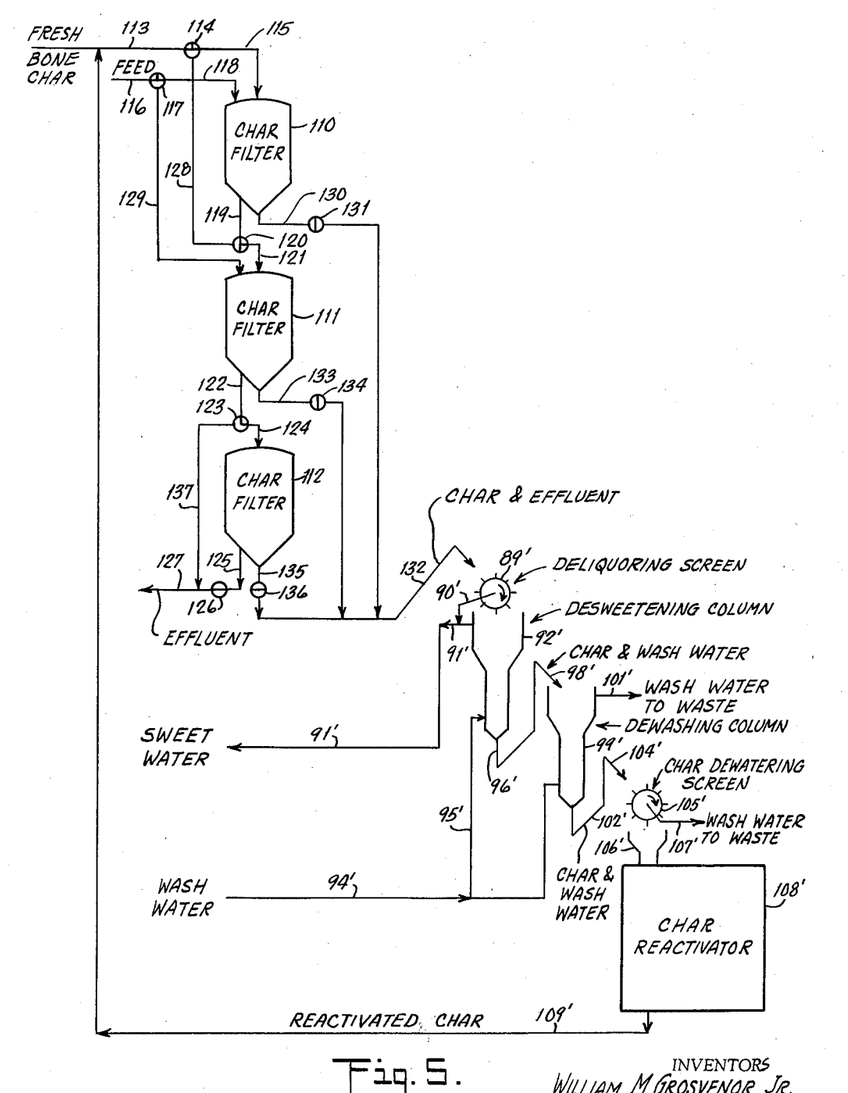
FIG. 5 is a flow sheet more completely illustrating the practice of this invention in an embodiment thereof employing series-connected plural char filters.

In FIG. 5 there is shown an embodiment of the invention employing a plurality of fixed bed char filters 110, 111 and 112 in series connection, illustrating a process flow for refining cane sugar solutions and employing bone char as the selective adsorbent, the purification of spent bone char being effected in apparatus identical to that of FIG. 4 and identified by identical primed numerals.

Fresh bone char is supplied through line 113, selectively adjustable valve 114 and line 115 to the fixed bone char filter 110. In one phase of operation, cane sugar solution to be purified is supplied to char filter 110 through line 116, selectively adjustable valve 117 and line 118. The flow of effluent from filter 110 proceeds through line 119, valve 120, and line 121 to char filter 111 and thence through line 122, valve 123 and line 124 to filter 112, purified sugar solution passing from the latter through line 125 and valve 126 for recovery from output line 127.

Lines 128 and 129 interconnect the valves 114 and 117 of the fresh bone char line 113 and the feed line 116, respectively, and the char filter 111. There are also provided a line 130 and valve 131 communicating between the filter 110 and the char and effluent line 132, a line 133 and valve 134 communicating between filter 111 and line 132, and a line 135 and valve 136 communicating between the filter 112 and the line 132.

The series connected filters 110 to 112 are operable in a selective, cyclic manner wherein one of the filters may be removed from the operating cycle for regeneration while the sugar purification process is continued in the remaining two filters. Illustratively, valves 114 and 117 each may be adjusted through a 90° counter-clockwise rotation to bypass filter 110 and supply the fresh bone char in line 113 and the feed solution in line 116 directly through lines 128 and 129 respectively, to the filter 111.

In this instance valve 120 is adjusted through a 90° clockwise rotation, thereby closing off line 119. The effluent purified in filter 111 then proceeds through line 122, valve 123, and line 124 to filter 112 for an additional step of purification, the sugar solution, or effluent, being recovered from line 125, valve 126, and output line 127.

Filters 111 and 112 thus continue the sugar purification while filter 110 is isolated from the operation and the spent char therein removed for washing and reactivation. For this operation, valve 131 is rotated through 90° and the spent char of filter 110 is carried through line 130 and valve 131 to the char and effluent line 132 for discharge onto the deliquoring screen 89'. The sugar liquor effluent is separated from the char by screen 89' and recovered at line 90', and the spent char subsequently is subjected to a continuous purification by passing through the desweetening column 92', the deashing column 99' and the char reactivator 180' in the manner hereinbefore described with reference to FIG. 4.

In a subseqeunt phase of operation, filters 110 and 111 may be operative and filter 112 isolated from the system for cleaning. For this operation, the valves are positioned initially as indicated in FIG. 5, valve 123 then being adjusted through a 90°, counter-clockwise rotation whereby the purified sugar solution in line 122 passes directly through line 137 to the output line 127. Valve 136 is adjusted through a 90° rotation and the spent char from filter 112 passes through the line 135 and valve 136 to the output line 132 for subseqeunt purification, as hereinbefore described. For clarity of illustration, there have been shown only sufficient input lines, interconnecting lines, and adjustable valves to enable selectively connecting filters 110 and 111, as the first filter, in series with filters 111 and 112, respectively, as the second filter, while the remaining filter, 112 or 110, respectively, is isolated from the system for cleaning. In accordance with known techniques, however, additional valves and interconnecting lines would be incorporated into the system of FIG. 5 to enable the cyclic operation of filters 110, 111, and 112 in any permutation desired; in addition, any number of char filters, such as 110 to 112 may be connected in series and adapted for cyclic operation. Furthermore, it is apparent that a system may be constructed comprising a plurality of parallel sets of char filters wherein each set comprises a plurality of series-connected char filters.

In the process flow illustrated in FIGS. 4 and 5 a deashing column is employed in combination with a desweetening column. A combination of both a desweetening column and a deashing column is desirable and usually necessary when bone char is employed as the purifying agent in the purification of sugar solutions, such as cane sugar solutions. When an activated carbon, such as an activated carbon derived from coal, e.g. activated carbons of the CAL and SGL type, identified hereinabove, is employed, a simpler system may be utilized. Such activated carbons, since they do not take up appreciable quantities of mineral or ash-forming inorganic materials from the sugar solutions undergoing treatment, may not require deashing. Accordingly, with the use of such activated carbon adsorbents the deashing operation may be dispensed with but all the advantages, such as reduced sweetwater production, controlled high concentration of sweetwater and increased productivity, are obtainable in accordance with the practices of this invention by carrying out the desweetening operation on a continuous basis in a continuous countercurrent liquid-solid contacting operation.

Various techniques and devices and apparatus may be employed to carry out the continuous desweetening operation and/or the continuous deashing operation. It is particularly preferred in the practice of this invention to carry out the continuous desweetening operation and/or the continuous deashing operation in the manner such that the wash water employed in such operations moves upwardly as a substantially lineal ascending column of liquid through the settling bed of spent char at a rate to maintain said bed of spent char in an expanded state as a substantially lineal descending column of expanded char. In this connection with respect to the operation of the desweetening column and/or the deashing column, reference is made to U.S. Patent 2,954,305, issued to William M. Grosvenor, Jr., one of the inventors herein, on September 27, 1960, which discloses operations and apparatus suitable for carrying out a continuous desweetening and/or continuous deashing operation in connection with the purification of sugar solutions wherein a downwardly moving bed of adsorbent material is caused to move in direct countercurrent contact with an upwardly flowing stream or body of wash water. The disclosures of this patent with respect to operations, method and apparatus for carrying out a continuous desweetening and/or continuous deashing operation are herein incorporated and made part of this disclosure.

As will be apparent to those skilled in the art in the light of the foregoing disclosure, many modifications, alterations and substitutions are possible in the practice of this invention without departing from the spirit or scope thereof.

What is claimed:

1. In an operation wherein aqueous sugar solution contacts a fixed bed of particle-form solid absorbent material to improve the color and other properties of the sugar solution and wherein the adsorbent, thus employed, becomes depleted of its ability to improve said sugar solution and wherein the resulting depleted adsorbent is treated to remove occluded sugar solution and to remove adsorbed water-soluble, inorganic material, previously adsorbed from said sugar solution, the improvement which comprises discharging depleted adsorbent from a fixed bed of adsorbent when the adsorbent therein has been substantially depleted of its capacity to effect improvement of sugar solution in contact therewith, supplying the discharged depleted adsorbent to a desweetening zone wherein said depleted adsorbent is subjected to continuous counter current contact with a stream of water introduced into the bottom portion of said desweetening zone, the depleted adsorbent being supplied to the top portion of said desweetening zone and the resulting desweetened adsorbent being removed from the bottom portion of said desweetening zone, the depleted adsorbent passing through said desweetening zone in a substantially continuous manner as a downwardly moving bed, withdrawing from the upper portion of said desweetening zone an aqueous sugar stream containing dissolved therein sugar solution which had previously been occluded in the depleted adsorbent supplied to the desweetening zone, supplying withdrawn desweetened adsorbent from the bottom of said desweetening zone to the upper portion of a deashing zone, moving the thus-withdrawn, desweetened adsorbent downwardly through said deashing zone as a downwardly moving bed in contact with a stream of water to effect removal of water-soluble, inorganic materials from said adsorbent by dissolution, withdrawing from the bottom of said deashing zone the resulting desweetened, deashed adsorbent and regenerating and returning the thus-treated adsorbent for eventual contact with additional aqueous sugar solution in the aforesaid fixed beds to improve said sugar solution.

2. The improved operation in accordance with claim 1 wherein said adsorbent is bone char.

3. In an operation wherein aqueous sugar solution is passed in contact with a plurality of fixed beds of bone char to effect improvement in said sugar solutions by removing color bodies, ash-forming constitutents and the like, and wherein after a period of time the bone char becomes depleted of its ability to effect improvement in said sugar solution, the improvement which comprises discharging depleted bone char from a fixed bed into a desweetening zone, the depleted bone char being supplied to the top of said desweetening zone, supplying water to the bottom of said desweetening zone such that the depleted bone char moves downwardly within said desweetening zone as a downwardly settling bed in countercurrent contact with said water, withdrawing an aqueous stream from the upper portion of said desweetening zone, said aqueous stream now containing dissolved therein the sugar solution occluded in the depleted bone char supplied to said desweetening zone, discharging desweetened, depleted bone char from the bottom of said desweetening zone and supplying the same to the upper portion of a deashing zone, supplying a stream of water to the lower portion of said deashing zone and operating said deashing zone such that the desweetened, depleted bone char supplied thereto moves therein as a downwardly settling bed in direct countercurrent contact with said stream of water introduced into the bottom of said deashing zone, withdrawing an aqueous stream from the top of said deashing zone, said aqueous stream containing water-soluble, inorganic material dissolved therein, said water-soluble, inorganic material having been removed from said desweetened bone char supplied to said deashing zone, discharging from the bottom of said deashing zone desweetened, deashed bone char, regenerating said desweetened, deashed bone char and returning the regenerated bone char to contact additional sugar solution to improve the properties thereof.

4. A method of processing aqueous sugar solutions by contact with particle-form adsorbent material to improve the sugar derivable from said sugar solutions which comprises providing a series of fixed beds of particle-form adsorbent useful for improving the properties, such as color and ash content, of sugar solutions, introducing a stream of aqueous sugar solution into the top of a fixed bed of adsorbent for flow therethrough, the stream of sugar solution being introduced into the top of the fixed bed of adsorbent in the first of said series, withdrawing the thus-treated sugar solution from the bottom of said first bed and introducing the same into the top of the second bed of said series and so forth, maintaining the flow of said stream of sugar solution through said series of beds until the adsorbent in the first bed of said series is substantially depleted of its capacity to effect improvement in the properties of the sugar solution flowing therethrough, discharging the resulting depleted adsorbent from the bottom of said first bed of said series, introducing the discharged, depleted adsorbent into the top of a desweetening zone, introducing a stream of water into the bottom of said desweetening zone, said desweetening zone being operated such that the adsorbent settles therein as a downwardly moving bed in direct countercurrent contact with the upwardly flowing water, discharging from upper portion of said desweetening zone an aqueous stream containing sugar solution dissolved therein, the dissolved sugar solution being derivable from the sugar solution occluded in the depleted adsorbent supplied to said desweetening zone, withdrawing desweetened adsorbent from the bottom of said desweetening zone, introducing the withdrawn, desweetened adsorbent into the top of a deashing zone for countercurrent flow therethrough in contact with a stream of water, said stream of water within said deashing zone serving to effect dissolution of adsorbed, water-soluble, inorganic material from said adsorbent, withdrawing deashed, desweetened, spent adsorbent from the bottom of said deashing zone, revivifying the deashed, desweetened, adsorbent withdrawn from the bottom of said deashing zone by high temperature contact with a gaseous oxygen-containing stream and returning the resulting revivified adsorbent to contact additional sugar solution to improve the same.

5. A method of treating sugar solutions to improve the quality thereof which comprises providing a plurality of fixed beds of bone char, the bone char being useful as an adsorbent for removing color bodies, ash-forming constituents and the like from sugar solutions to improve the properties thereof, said fixed beds of bone char being arranged for series flow of sugar solution therethrough, said sugar solution being introduced into the top of the first bed of said bone char in said series, withdrawn from the bottom thereof and introduced into the top of the second bed of said series and so forth through the last of said beds of said series, the bone char adsorbent in each of said beds having a finite capacity for improving the properties of said sugar solution when treated in the above manner, carrying out the aforesaid operation until the bone char in the first bed of said series of beds has become depleted of its capacity to effect further improvement in the quality of the sugar solution in contact therewith, discharging the resulting bone char adsorbent from said first bed and introducing sugar solution into said second bed of said series, introducing the discharged bone char from said first bed into the top of a desweetening zone, introducing into the bottom of said desweeting zone an aqueous stream, moving the spent bone char adsorbent downwardly within said desweetening zone as a downwardly moving bed in direct countercurrent contact with said aqueous stream, withdrawing from the upper portion of said desweetening zone said aqueous stream now containing sugar solution dissolved therein, said dissolved sugar solution being derivable from the sugar solution occluded in the spent bone char supplied to said desweetening zone, discharging desweetened bone char adsorbent from the the bottom of said desweetening zone, introducing the thus-discharged, desweetened bone char into the top of a deashing zone, moving the desweetened bone char downwardly through said deashing zone in direct countercurrent contact with an upwardly flowing stream of water to effect dissolution of adsorbed, water-soluble, inorganic compounds from the desweetened bone char therein, withdrawing from the bottom of said deashing zone resulting deashed, desweetened bone char, subjecting the thus-treated bone char adsorbent to revivification by high temperature contact with a gaseous oxygen-containing stream to restore the bone char adsorbent to its initial capacity to effect improvement in sugar solutions in contact therewith and returning to the treating system the revivified bone char adsorbent as bone char adsorbent in the last bed of said series of fixed beds.

6. In an operation wherein aqueous sugar solution contacts a fixed bed of particle-form solid adsorbent material to improve the color or other properties of the sugar solution and wherein the adsorbent, thus employed, becomes depleted of its ability to improve said sugar solution and wherein the resulting depleted adsorbent is treated to remove occluded sugar solution and to remove adsorbed water-soluble, inorganic material previously adsorbed from said sugar solution, the improvement which comprises discharging depleted adsorbent from a fixed bed of adsorbent when the adsorbent therein has become substantially depleted of its capacity to effect improvement of sugar solution in contact therewith, supplying the discharged depleted adsorbent to a desweetening zone wherein said depleted adsorbent is subjected to continuous contact with a stream of water introduced into said desweetening zone, the depleted adsorbent passing through said desweetening zone in a substantially continuous manner, withdrawing from said desweetening zone an aqueous sugar stream containing dissolved therein sugar solution which had previously been occluded in the depleted adsorbent supplied to the desweetening zone, removing depleted adsorbent from said desweetening zone and supplying the removed depleted adsorbent to a deashing zone, moving the desweetened adsorbent through said deashing zone in a substantially continuous manner in contact with a stream of water therein to effect removal of water-soluble inorganic materials from said adsorbent by dissolution, withdrawing from said deashing zone the resulting desweetened, deashed adsorbent and returning the thus-treated adsorbent for eventual contact with additional aqueous sugar solution in the aforesaid fixed bed to improved said sugar solution.

7. In an operation wherein aqueous sugar solution contacts a fixed bed of particle-form solid treating agent to improve the color or other property of the sugar solution and wherein the treating agent, thus employed, becomes depleted of its ability to improve said sugar solution and wherein the resulting depleted treating agent is treated to remove occluded sugar solution, the improvement which comprises discharging treating agent from a fixed bed of treating agent when the treating agent therein has been substantially depleted of its capacity to effect improvement of sugar solution in contact therewith, supplying the discharged depleted treating agent to a desweetening zone wherein said depleted treating agent is subjected to continuous countercurrent contact with a stream of water introduced into the bottom portion of said desweetening zone, the depleted treating agent being supplied to the top portion of said desweetening zone and the resulting desweetened treating agent being removed from the bottom portion of said desweentening zone, the depleted treating agent passing through said desweetening zone in a substantially continuous manner as a downwardly moving bed and withdrawing from the upper portion of said desweetening zone an aqueous stream containing dissolved therein the sugar solution previously occluded in the depleted treating agent supplied to the desweetening zone.

8. A method in accordance with claim 7 wherein said treating agent is bone char.

9. A method in accordance with claim 7 wherein said treating agent is an activated carbon.

10. A method in accordance with claim 7 wherein said treating agent is an ion exchange resin.

11. A method in accordance with claim 7 wherein the resulting withdrawn, desweetened treating agent is subjected to reactivation to restore the treating agent to a condition effective upon contact with said sugar solution to improve the color or other property thereof.

References Cited by the Examiner

UNITED STATES PATENTS

| | | | |
|---|---|---|---|
| 1,620,431 | 3/27 | Bramwell | 210—189 |
| 1,646,079 | 10/27 | Battelle | 210—33 X |
| 1,763,783 | 6/30 | Hodkinson | 210—33 |
| 2,073,388 | 3/37 | Elliot et al. | 127—55 X |
| 2,767,140 | 10/56 | Fitch | 210—33 |
| 2,954,305 | 9/60 | Grosvenor | 127—55 |
| 2,969,297 | 1/61 | Grosvenor | 127—55 |
| 2,973,319 | 2/61 | Porter | 210—33 |

MORRIS O. WOLK, *Primary Examiner.*